Dec. 18, 1956
H. M. GEYER
2,774,336
LOCKING MEANS FOR FLUID MOTOR OR THE LIKE
Original Filed Feb. 25, 1949
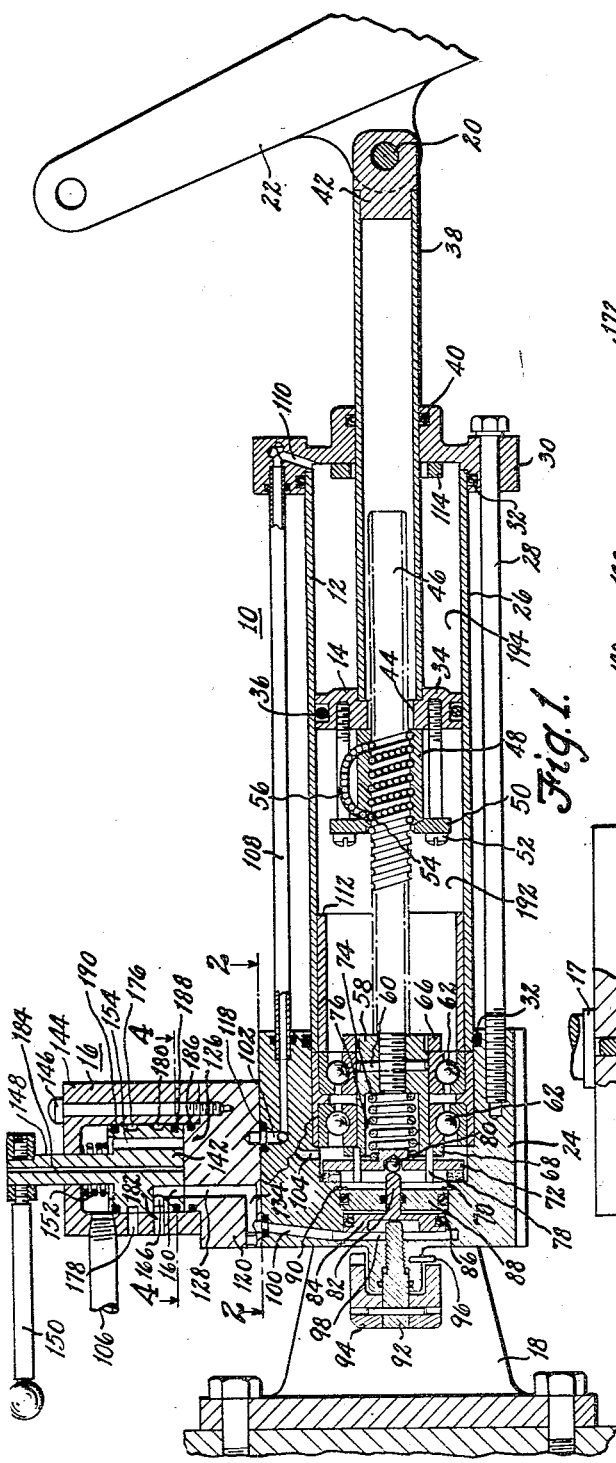
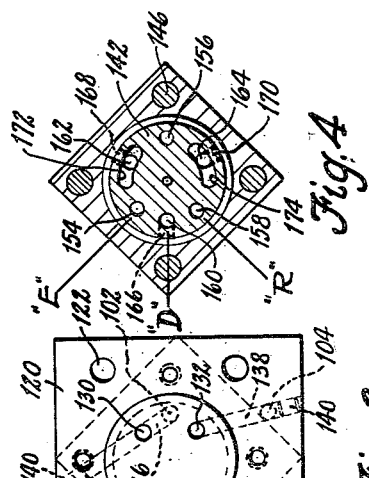
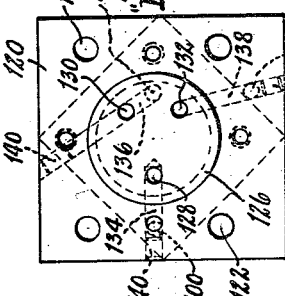
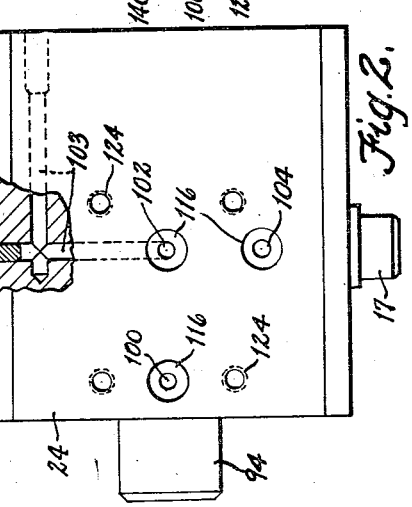
INVENTOR
*Howard M. Geyer*
By
*Spencer, Hardman & Fehr*
His ATTORNEYS United States Patent Office 2,774,336
Patented Dec. 18, 1956

2,774,336

LOCKING MEANS FOR FLUID MOTOR
OR THE LIKE

Howard M. Geyer, Dayton, Ohio, assignor to General Motors Corporation, Detroit, Mich., a corporation of Delaware Continuation of abandoned application Serial No. 78,412, February 25, 1949. This application November 27, 1953, Serial No. 394,660

9 Claims. (Cl. 121—40)

This invention relates to fluid pressure actuators, particularly of the class where a chamber having a movable wall is exposed to differentials of pressure for movement of the wall to actuate a member or linkage required to exert some force upon a load intended to be moved, and is a continuation of abandoned application Serial No. 78,412, filed February 25, 1949.

Fluid pressure actuators, particularly of the pneumatic type, are subject to sudden force applications upon the work arm or member to be actuated, and some times act with percussive or hammer-like results. The action starts suddenly and is likely to exceed the exact movement desired because of the expansive and compressible nature of the fluid medium. When the fluid medium is of the liquid type or relatively non-compressible, the same characteristics may obtain but are less material and less objectionable yet serious enough to justify improvement. The principal fault with such devices resides in the fact that suitable position control has not been provided, so that the piston or movable element of the actuator can be stopped exactly at the point desired.

This invention provides means for holding the piston of a fluid pressure actuator at any assumed position along the length of a cylinder, and in addition tends to damp out the sudden start of the piston when pressure is applied to the enclosing cylinder, as well as introduces sufficient drag on continued movement of the piston to effect its immediate stoppage as soon as the actuating pressure is cut off from the enclosing cylinder, thereby reducing, if not eliminating, the coasting of the piston beyond the desired position. The improved action of the actuator, whether of the fluid or liquid operated type, is accomplished by incorporating a screw shaft with a rotary bearing in one end of the cylinder, and which shaft threads by means of a ball-nut device through the actuator piston, and embodies an axially shiftable brake disc normally urged to engage a fixedly supported friction element to prevent the screw shaft rotation, and consequent linear piston movement. A secondary piston charged with pressure substantially coincident with application of pressure to the actuator piston, operates to disengage the disc and friction element enough to permit rotation of the screw shaft and consequent linear movement of the actuator piston so long as the application of pressure thereto is maintained. As soon as the pressure is released from the actuator piston it is also released from the secondary or brake release piston, and the brake disc and friction element reengage to arrest and hold the actuator piston in the assumed position.

Should the linkage for operation of the control valve be damaged or should the pressure source lines to the unit experience such accident that the actuator piston would be locked in some position without other means for release, a free-fall control is provided whereby the brake disc and the friction element can be manually separated to permit rotation of the shaft and linear movement of the actuator piston through reverse action of the load through its linkage.

It is therefore an object of this invention to provide a fluid pressure actuator for effecting movement of work performing elements that will assume a desired position and be held in that assumed position against the reaction of the load through the work performing elements.

Further objects and advantages of the present invention will be apparent from the following description, reference being had to the accompanying drawings wherein a preferred embodiment of the present invention is clearly shown.

In the drawings:

Fig. 1 is a longitudinal sectional view through a fluid pressure actuator embodying the instant invention, with a control valve for its operation between a support and a work arm.

Fig. 2 is a top plan view of the cylinder head cap substantially as indicated by the line and arrows 2—2 of Fig. 1, but on a larger scale.

Fig. 3 is a plan view to the same scale of a porting block of the control valve that is mounted on the head cap of the cylinder.

Fig. 4 is a horizontal sectional view through the control valve as indicated by the line and arrows 4—4 of Fig. 1.

With specific reference to the drawings 10 refers to a fluid pressure actuator unit disclosing the instant invention, and comprises a cylinder 12, a piston 14, and a control valve 16 united into a compact unit to be mounted on trunnions 17 provided by a support or bracket 18 and linked at 20 to a work arm 22 of some load device.

The cylinder comprises a head cap member 24 secured at one end of a tubular sleeve 26 by through bolts or the like 28 holding a tail cap 30 in compressing relation against opposite ends of the tubular sleeve 26. Both the head cap and tail cap are axially bored to receive each one end of the sleeve 26 and undercut to receive seal rings 32.

The piston 14 comprises a disc or head member 34 preferably grooved to receive a seal ring 36 making seal relation with the interior of the sleeve 26. A piston rod 38 of tubular form is secured at the axis of the head 34 and extends through an axial bore of the tail cap 30 to engage a seal 40 and to end with an eye piece 42 pivotally secured to the work arm 22. A central bore 44 through the piston head 34 receives a screw shaft 46 that is threaded through a nut 48 secured to one side of the piston head 34 by means of a clamp plate 50 and screws 52 threaded into the piston head 34.

Both the screw shaft 46 and the nut 48 are semi-circularly grooved in a complementary spiral fashion to provide a track for a series of balls 54 disposed therein, thus affording a substantially frictionless ball-nut and screw connection between the screw shaft 46 and piston head 34. A bent tube 56 secured to the nut 48 provides a return path for the balls as they leave one end groove and transfer to the other end groove of the nut as the piston moves along the screw shaft.

The screw shaft 46 threads into a head member 58 where it is locked against turning by a cross pin or the like 60, and the screw head 58 supports a pair of inner race members of antifriction bearings 62 by the clamping action of the bolts 28 upon the cylinder sleeve 26, and thus the screw shaft is prevented against movement axially of the head cap. Lock nut 66 threaded upon the screw head 58 clamps the inner race members against axial movement with respect to a flange 68 provided by the screw head 58. Fixed in the end of the flange 68 there are a plurality of guide pins 70 that slidably engage a brake disc 72, urged axially by a spring 74 disposed in a recess 76 axially of the screw head 58. The spring 74 being under compression, tends to separate the disc 72 from the flange 68 of the screw head, by pushing it along the guide pins 70 toward engagement with a frictional element 78 mounted on a ledge of the counterbore of the head cap 24.

Centrally disposed of the brake disc 72 there is a thrust bearing 80 adapted to be engaged by the stem 82 of a piston 84 disposed in a cylinder 86 provided by the head cap 24, which stem is guided and supported by a disc 88 retained in place by a snap ring 90. A screw 92 threaded from the exterior of the head cap 24 therethrough, engages the piston 84 and operates when manually actuated to push the piston 84 with stem 82 against the thrust bearing 80 sufficient to disengage the bearing disc 72 from frictional element 78. That can be accomplished by a knob 94 pinned to the screw 92 and limited in rotation by the cross pin 96.

Behind the piston 84 there is a chamber 98 that is fed by passage 100 with fluid pressure also for urging the piston and its stem 82 against the thrust bearing 80. The head cap 24 also provides control passages 102 and 104 that are adapted upon the operation of the control valve 16 to be connected one at a time with a passage 106 having connection with a source of fluid pressure for operating the fluid pressure actuator. The passage 104 opens into the bore of the head cap and admits fluid pressure which may readily traverse the bearing member 62 to the cylinder 12 on the left hand side of the piston 34, and the passage 102 connects by branch 103 with a tubular member 108 that leads to the passage 110 in the tail cap 30 to the right hand side of the piston 34.

The control valve 16 is such that it may be operated for directing the fluid pressure from 106 to either the passage 104 or 102 and at the same time applies pressure to the passage 100 and cylinder 86 against the piston 84. Thus, in the application of fluid pressure to one side of the piston 34 and drain from the other side thereof, the piston 34 with its rod 38 will effect lineal movement along the cylinder 26, since it cannot rotate because of the linkage of the rod 38 with the work arm 22. At the same time the pressure applied to the chamber 98 at the end of cylinder 86, disengages 72 from 78 which permits the screw shaft 46 to rotate easily within the sleeve nut 48 carried by the piston head 34.

The screw shaft 46 must rotate upon lineal movement of the piston 34 since all axial movement at the screw shaft and head are prevented by the antifriction bearing 62. When the piston 34 has been moved to the assumed position, that is, anywhere along the cylinder 12 defined by the stops 112 and 114, the valve 16 is actuated to cut off further flow of fluid pressure and the piston 34 immediately stops, with a coordinated reduction of pressure in the chamber 98 which permits the reengagement of the elements 72 and 78 thereby locking the piston 34 in the assumed position. The lock is applied with such force that any load applied to the link 22 is unable to move the piston 34 along the cylinder 12. Thus, a position lock is afforded that positively retains the actuated device in any one of an infinite number of positions selected along the range of travel.

There are inherent in the screw shaft head and brake, other features that make it desirable for use with a fluid pressure actuator of the type herein disclosed, particularly if the fluid medium is a compressible one such as air or gas. Pneumatic actuators have characteristics of rapid pick-up and coasting to such an extent that the piston when the pressure is applied, starts to move rapidly and then at the cut-off of pressure, coasts on somewhat beyond the desired position. But with the device disclosed herein, the position lock must start to rotate at the very instant that the piston begins to move, and the required torque for starting rotation of the screw 46 and head 48 effectively counteracts or opposes the tendency to rapidly accelerate, so that percussive type of piston movement is eliminated. On the other hand, the torque required for rotation of the screw shaft 46 during piston movement is enough that the damping action introduced substantially eliminates coasting of the piston beyond the desired position when the operating force is cut off. When that is augmented by the engagement of the disc 72 and friction face 78 the piston stops movement at the desired position.

The control valve 16 by which the fluid pressure actuator is controlled is shown in vertical section in Fig. 1 with details shown in Figs. 3 and 4. As shown in Fig. 2 the fluid passages 100, 102 and 104 in the head cap 24 terminate on the top surface thereof with countersinks 116 for reception of seal rings 118 engageable by the lower surface of a porting block 120 that is secured in place by screw devices passing through holes 122 to thread into threaded holes 124 in the head cap 24. The block 120 has centrally disposed thereof a round turret portion 126 providing ports or orifices 128, 130 and 132 connected by passages 134, 136 and 138 respectively with the sealed ends of passages 100, 102 and 104 in the head cap 24. The passages 134, 136 and 138 are drilled in from the edges of the block 120 to intersect vertical drillings for the ports opening from the top and bottom surfaces of the block, and then have their open ends closed by appropriate plugs 140 as shown in Fig. 3.

Disposed over the turret portion 120 there is a valve plug 142 enclosed by a cap 144 that telescopes over the turret 126 where it is retained by hold-down screws 146, with a stem 148 extending outside to receive a handle or other operating member 150. The valve plug 142 is urged by a spring 152 within the cap 144 downward to engage the top of the turret 126, and is provided with ports and passages adapted upon selected movement by the member 150 to control the application of pressure and drain through the various ports. As shown in Fig. 4, those ports and passages include three axial bores 154, 156 and 158 that admit the pressure from source passage 106 to the top surface of the turret 126 and thus to the ports 128, 130 and 132 when properly aligned. There are also three passages 160, 162 and 164 that start from the bottom end of the valve plug to branch off at 166, 168 and 170 to end in peripheral grooves around the plug. At the bottom face of the plug there are arcuate recesses 172 and 174 opening into the passages 168 and 170, respectively, so as to properly extend their porting capacity. These two passages 162 and 164 have their lateral branches 168 and 170 opening into a peripheral groove 176 that always communicates with an exhaust port 178 in the side of the valve cap 144 and each operates as a drain port for one side of the cylinder 12 when the other side is exposed to pressure. The lateral branch 166 from the passage 160 opens into a peripheral groove 180 of the plug which always communicates with an exhaust port 182 of the cap 144 for drain from the brake release piston 84. Extending throughout the valve plug 142 and its stem 148 there is a drillway 184 that prevents the trapping of any pressure medium between the plug 142 and the turret 126. Seal rings 186, 188 and 190 are disposed in peripheral grooves about the turret 126 and the plug 142 to eliminate undue leakage and cross-flow of the fluid pressure medium.

The specific operation of the control valve may be followed if the view of Fig. 4 is shifted to the left to superimpose over the port showing in Fig. 3, keeping the same orientation, which is the rest or drain position obtaining with respect to the showing in Fig. 1. In that position, both the brake release piston and both sides of the actuator piston are exposed to drain, and the piston 34 is held in the assumed position by the position lock elements 72 and 78, whether the piston occupies some intermediate position as shown in Fig. 1, or be against one of the stops 112 or 114. In that superimposed position, the pressure passages 154, 156 and 158 of the valve plug open against the plane solid face of the turret 126, and do not connect with any port therein. The brake cylinder port 128 of the turret is then aligned with the passage 160 of the plug which opens by its branch 166 to groove 180 around the plug and thence through port 182 of the cap 144 to atmosphere or other relief. The ports 130 and 132 of the turret are each open to the arcuate recesses 172 and 174, respectively, in the end of the plug which in turn open to the passages 162 and 164, respectively, having branches 168 and 170 leading to the plug groove 176 for exhaust through port 178.

To move the actuator piston in either direction, the handle or member 150 is manipulated so as to rotate the plug 142 from the position shown in Fig. 1, and indicated by the letter "D" (drain) in Fig. 4, either to the extend position, "E" of Fig. 4, or to the retract position "R" of Fig. 4. Point "D" of Fig. 4 will then be superimposed over either "E" or "R" of Fig. 3. Since the sequence of events that take place are the same in either event, it is deemed sufficient to trace the operation in shifting the control valve plug 142 from the all drain position "D" to the actuator extend position "E." That is accomplished by rotating the plug in a clockwise direction as viewed in Figs. 3 and 4. The first part of that clockwise movement closes the drain passages for the turret ports 128 and 132.

The angular relation of the ports in the turret and plug are such that the drain for the brake release cylinder 86 through turret port 128 is cut off a little in advance of the cut-off of drain from the extend chamber 192 of the cylinder 26, through turret port 132. In other words, 160 disconnects from 128 before 174 disconnects from 132. The retract chamber 194 of the cylinder 26 is still open to drain through slot 172. Continued clockwise rotation of the valve plug completes the cut-off of drain through 132 and 174, and applies or directs pressure to turret ports 128 and 132. However, it is desirable that port 132 is open to pressure through passage 156 a little before the port 128 is exposed to pressure through 158, so that by the time pressure is applied to the brake release cylinder 86, pressure will have acted upon the actuator piston 34 to pick up the load acting through link 22. As soon as the brake release piston disengages the elements 72 and 76, the actuator piston is free to move the load. By the time the plug is rotated to the position indicated by "E," the brake release cylinder 86 is wide open to pressure through 100, 134, 128, 158 and 106, the extend chamber 192 is wide open to pressure through 104, 138, 132, 156 and 106, and the retract chamber 194 is wide open to drain through 110, 108, 103, 102, 130, 172, 162, 168, 176 and 178. Under those conditions the piston 34 moves along the cylinder 26 until it engages the stops 114, unless the valve 16 is operated to cut off the pressure to the extend chamber, by reverse rotation of the plug 142.

Reverse rotation of the plug from the extend position interrupts the application of pressure to the brake release cylinder 86 in a little in advance of interrupting pressure to the extend chamber 192. In other words turret port 128 is closed to pressure slightly prior to the closing of turret port 132. Continued reverse rotation of the plug 142 opens the turret port 128 to drain through plug passage 160, 166 and 182 before the turret port 132 is opened to drain through plug passage 174, 164, 176, 178 whereby the assumed position of the actuator piston 34 is attained by pressure application and cut-off rather than by the drag of the brake elements 72 and 78. However, continued return rotation of the valve plug 142 to the drain position "D" restores the conditions illustrated, and all piston chambers are open to drain as has been shown and described with respect to Fig. 1.

A counterclockwise rotation of the plug from the drain position "D" to the retract position "R" will effect a similar sequence of events to apply pressure from the pressure source conduit 106 to the retract chamber 194 and brake release chamber 86 with a consequent assumed position of the actuator piston 34 somewhere toward the stop 112, depending upon the cut-off effected by return rotation of the valve plug and engagement of the elements 72 and 78.

While the embodiment of the present invention as herein disclosed, constitutes a preferred form, it is to be understood that other forms might be adopted.

What is claimed is as follows:

1. A fluid pressure actuating unit, comprising in combination, a cylinder with a support, a piston movable therein, a piston rod movable along the cylinder and connected to a load, means for applying and draining fluid pressure to and from the cylinder, lock means cooperable with the cylinder and piston for maintaining an assumed position of the piston against movement by the load, including a screw threaded in the piston and extending along a central bore of the piston rod, a head member of the screw journalled in one end of the cylinder, a brake disc driven by the screw head and supported for axial movement thereof, a friction surface provided by the cylinder adjacent the disc and adapted to be engaged thereby, spring means supported by the head member of said screw normally effecting engagement between the disc and the friction surface, and means operable coincident with application of fluid pressure to the said cylinder for disengaging the brake disc and friction surface.

2. The combination set forth in claim 1 wherein the means for disengaging the brake disc includes a secondary piston and cylinder operable upon fluid pressure application to force the disc away from the friction surface.

3. The combination set forth in claim 1 wherein the means for disengaging the brake disc includes a pressure responsive device in parallel with the actuator cylinder, for disengaging the brake disc, said device being operable upon energization to move the disc against the force of said spring means.

4. A fluid pressure actuating unit, comprising in combination, a cylinder with a piston and piston rod connected between relatively fixed and movable support members, said cylinder comprising a tubular member, a tail cap and a head cap fixed in sealed relation at opposite ends of said tubular member, a control valve mounted on the head cap, fluid passages connecting the valve with a source of fluid pressure and with the opposite ends of said cylinder, a screw having a head rotatably secured in the head cap of the cylinder, and a stem threadedly received in the piston, a cylindrical stop within the cylinder at the head cap end preventing engagement between the piston and the screw head, application of fluid pressure to either end of the cylinder effecting linear movement of the piston and rotary movement of the screw, a friction face provided by the head cap of the cylinder, a brake disc driven by the screw head, spring means normally effecting engagement of the disc and friction face to hold the screw against rotation, means coincidentally operable with application of fluid pressure to either end of the cylinder for separating the disc and friction face, and a manually operable pin carried by the head cap of the cylinder for actuating the brake disc to effect free-fall of the piston within the cylinder in response to load upon the piston rod.

5. A fluid pressure operated actuator comprising in combination; a cylinder; a piston in said cylinder, said piston having a rod extending coaxially from the cylinder; means operative to direct fluid pressure into and drain fluid from said cylinder for reciprocating the piston therein; locking means interposed between the piston and cylinder for preventing reciprocation of the piston, said locking means comprising a brake element immovably attached to the cylinder and a cooperating, rotatable member disposed within said cylinder and normally urged into locking engagement with said brake element, said rotatable member being mechanically connected to the piston so as to be rotated in response to piston reciprocation; and means operative coincidentally with the introduction of fluid pressure into the cylinder for disengaging the rotatable member from the brake element to permit reciprocation of the piston.

6. A fluid pressure operated actuator comprising in combination, a cylinder; a piston reciprocative therein, said piston having a rod extending axially from the cylinder; means for directing fluid pressure into and draining fluid from said cylinder; a screw device having a head portion rotatably supported in the cylinder, said screw device threadedly engaging the piston so as to be rotated in response to piston reciprocation; and means for preventing rotation of said screw device during the absence of fluid pressure in the cylinder, said means comprising normally engaging fixed and rotatable elements, the former attached to the cylinder, the latter to the screw head, said screw device rotation-prevention means being operative to release the screw device coincidentally with the introduction of fluid pressure into the cylinder.

7. A fluid pressure operated actuator comprising in combination, a cylinder, a piston reciprocative therein, said piston having a rod extending axially from the cylinder, means for directing pressure fluid into and draining fluid from said cylinder, a screw device having a head portion rotatably supported in the cylinder, said screw device threadedly engaging the piston so as to be rotated in response to piston reciprocation, means for preventing rotation of said screw device during the absence of pressure fluid in the cylinder, said means including a disc driven by the screw head and axially movable relative thereto, a spring under compression tending to separate the disc and the head, and a friction face carried by the cylinder head engageable by the disc under the urge of said spring, and means energized coincident with application of pressure fluid to said cylinder for disengaging the disc from the friction face.

8. A fluid pressure actuating unit comprising in combination, a cylinder with a support, a piston movable therein, a piston rod movable along the cylinder and connected to the load, means for applying pressure fluid to and draining fluid from the cylinder, lock means cooperable with the cylinder and piston for maintaining an assumed position of the piston against movement by the load including a screw threaded in the piston and extending along a central bore of the piston rod, a head member of the screw journaled in one end of the cylinder, a brake disc driven by the screw head and supported for axial movement thereof, a friction surface provided by the cylinder adjacent the disc and adapted to be engaged thereby, and spring means normally effecting engagement between the disc and the friction surface, means operable coincident with application of pressure fluid to said cylinder for disengaging the brake disc and the friction surface, and manual means at one end of the cylinder for disengaging the brake disc and the friction surface to effect free-fall of the piston with respect to the cylinder.

9. An actuator including in combination, a cylinder, a lineally movable piston in said cylinder capable of fluid pressure actuation in either direction, a first member rotatably supported in said cylinder, a second nonrotatable member in said cylinder having operative engagement with said rotatable member, one of said members being operatively connected to said piston and constrained to move lineally therewith, the construction and arrangement being such that relative rotation occurs between said members upon lineal movement of said piston, locking means operatively connected with the rotatable member for preventing rotation of the rotatable member and consequent lineal movement of the piston, and fluid pressure operated means for releasing said locking means to permit rotation of said rotatable member and consequent lineal movement of said piston upon application of fluid pressure to either side of said piston, said locking means comprising a first locking element anchored to said cylinder, a second locking element operatively connected to said rotatable member, the operative connection between the second locking element and the said rotatable member permitting relative axial movement therebetween but preventing relative rotation therebetween, and resilient means normally maintaining said locking elements in engagement, said lock releasing means comprising a lock release cylinder formed within an end wall of the actuator cylinder, a lock release piston disposed in said lock release cylinder and mounted for reciprocal movement therein, and means operatively connected with said lock release piston and engageable with said second locking element for moving the second locking element axially relative to the first locking element to disengage said locking elements upon application of fluid pressure to one side of said lock release piston.

References Cited in the file of this patent
UNITED STATES PATENTS

| | | |
|---|---|---|
| 679,421 | Halsey | July 30, 1901 |
| 1,077,862 | Stafford | Nov. 4, 1913 |
| 1,643,563 | Nell | Sept. 27, 1927 |
| 2,523,053 | Obrist | Sept. 19, 1950 |
| 2,632,426 | Geesink | Mar. 24, 1953 |

FOREIGN PATENTS

| | | |
|---|---|---|
| 436,271 | France | Jan. 19, 1912 |